(12) United States Patent
Donley et al.

(10) Patent No.: US 9,800,545 B2
(45) Date of Patent: Oct. 24, 2017

(54) ROLE BASED ROUTER FUNCTIONALITY

(71) Applicant: Cable Television Laboratories, Inc., Louisville, CO (US)

(72) Inventors: Christopher J. Donley, Broomfield, CO (US); Christopher Grundemann, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 82 days.

(21) Appl. No.: 14/250,444

(22) Filed: Apr. 11, 2014

(65) Prior Publication Data

US 2014/0222978 A1    Aug. 7, 2014

Related U.S. Application Data

(63) Continuation-in-part of application No. 13/792,016, filed on Mar. 9, 2013.

(60) Provisional application No. 61/771,807, filed on Mar. 2, 2013, provisional application No. 61/712,318, filed on Oct. 11, 2012.

(51) Int. Cl.
| | | |
|---|---|---|
| *G06F 15/16* | (2006.01) | |
| *H04L 29/06* | (2006.01) | |
| *H04L 29/12* | (2006.01) | |
| *H04L 12/24* | (2006.01) | |
| *H04L 12/715* | (2013.01) | |
| *H04L 12/741* | (2013.01) | |

(52) U.S. Cl.
CPC .......... *H04L 63/02* (2013.01); *H04L 41/0816* (2013.01); *H04L 45/46* (2013.01); *H04L 61/2015* (2013.01); *H04L 45/74* (2013.01); *H04L 61/6059* (2013.01)

(58) Field of Classification Search
CPC ................. H04L 63/02; H04L 41/08
See application file for complete search history.

(56) References Cited

U.S. PATENT DOCUMENTS

| | | | |
|---|---|---|---|
| 7,729,312 B2 * | 6/2010 | Suzuki et al. | 370/331 |
| 7,843,923 B2 | 11/2010 | Baum | |
| 8,059,661 B2 | 11/2011 | Patel | |
| 8,307,422 B2 * | 11/2012 | Varadhan et al. | 726/15 |
| 8,451,844 B2 * | 5/2013 | Boucadair et al. | 370/393 |
| 8,576,857 B2 * | 11/2013 | Singh et al. | 370/401 |
| 8,681,695 B1 * | 3/2014 | Krishnan | H04L 61/2015 370/328 |
| 8,737,396 B2 * | 5/2014 | Nishiyama | 370/389 |

(Continued)

OTHER PUBLICATIONS

Network Working Group, RFC 3633, IPv6 Prefix Options for Dynamic Host Configuration Protocol (DHCP) version 6, Dec. 2003.*

(Continued)

*Primary Examiner* — John MacIlwinen
(74) *Attorney, Agent, or Firm* — Great Lakes Intellectual Property, PLLC

(57) ABSTRACT

Configuration of firewall functionality and/or determining positioning for routers operating within a multi-router network is contemplated. The firewall functionality configured for one or more of the routers may be based router positioning within the multi-router network. The firewall functionality may be automatically selected according to the router positioning in order to facilitate dynamic and/or adaptive router configuring.

19 Claims, 3 Drawing Sheets

(56) References Cited

U.S. PATENT DOCUMENTS

| | | |
|---|---|---|
| 2006/0159086 A1* | 7/2006 | Bras .................... H04L 29/06 370/389 |
| 2008/0259925 A1 | 10/2008 | Droms |
| 2011/0182295 A1 | 7/2011 | Singh |
| 2012/0314617 A1* | 12/2012 | Erichsen et al. .............. 370/254 |

OTHER PUBLICATIONS

How IPv6 Works by Microsoft Technet (Mar. 2003).*
RFC3315: Dynamic Host Configuration Protocol for IPv6 (DHCPv6) by Network Working Group.*
Network Working Group. An IPv6 Aggregatable Global Unicast Address Format, RFC2374 (Jul. 1998).*
Cisco. "DHCPv6 Based IPv6 Access Services". 2011. pp. 1-52.*
Singh et al. "Basic Requirements for IPv6 Customer Edge Routers". draft-ietf-v6ops-6204bis-11. Sep. 25, 2012. pp. 1-22.*
Singh et al. "Advanced Requirements for IPv6 Customer Edge Routers". draft-ietf-v6ops-cpe-router-bis-01. Jul. 11, 2012. pp. 1-15.*
Troan and Dromas. "IPv6 Prefix Options for Dynamic Host Configuration Protocol (DHCP) version 6". RFC 3633. Dec. 2003. pp. 1-19.*
International Search Report and Written Opinion for Related PCT Application, Dec. 23, 2013, 8 pages.

* cited by examiner

ROLE BASED ROUTER FUNCTIONALITY

CROSS-REFERENCE TO RELATED APPLICATIONS

This application is a continuation-in-part of U.S. application Ser. No. 13/792,016, filed Mar. 9, 2013, which in turn claims the benefit of U.S. provisional Application No. 61/771,807 filed Mar. 2, 2013 and U.S. provisional Application No. 61/712,318 filed Oct. 11, 2012, the disclosures of which are incorporated in their entirety by reference herein.

TECHNICAL FIELD

The present relates to configuring functionality for routers included within a multi-router network, such as but not necessary limited to facilitating will role based firewall where firewall functionality is dynamically varied according to router positioning within the multi-router network.

BACKGROUND

A multi-router network may be characterized as a network having a plurality of routers connected together and arranged in a logical hierarchy. With the launch of new services, such as but not limited to home security, IP video, Smart Grid, etc., and more consumer devices, such as but not limited to televisions, mobile phones, appliances, etc., being configured with routers, multi-router networks are becoming more prevalent. Multi-router networks require multiple routers to communicate with each other over network links, the establishment of messaging protocols, hierarchical relationships, address assignments, prefix delegations, security measures, backup capabilities and a potential number of additional functional capabilities in order to properly and securely govern network communications. As the prevalence of such multi-router networks continues to grow, one non-limiting aspect of the present invention contemplates a need to facilitate configuring routers to operate in in such a complex environment.

Without intending to limit the scope of the present invention, and while not dispositive of environments where a need may exist to facilitate configuring routers, one non-limiting aspect of the present invention foresees a particular need in facilitating configuration of routers employed in small office and home office (SoHo) environments. SoHo and similar environments may employ routers having off-the-shelf, default, pre-configured and/or consumer-level configurations where the corresponding routers may be commonly referred to as home Internet Protocol (IP) network (HIPnet) routers. Such pre-configurations may thwart inter-router communications and other operations associated with facilitating use and/or construction of a multiple-router network. Default firewall and/or network address translator (NAT) setting of such HIPnet routers may particularly disrupt inter-router communications, particularly communications from one subnet to another. Accordingly, one non-limiting aspect of the present invention contemplates facilitating configuration of HIPnet or other types of pre-configured routers for use in multi-router networks.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
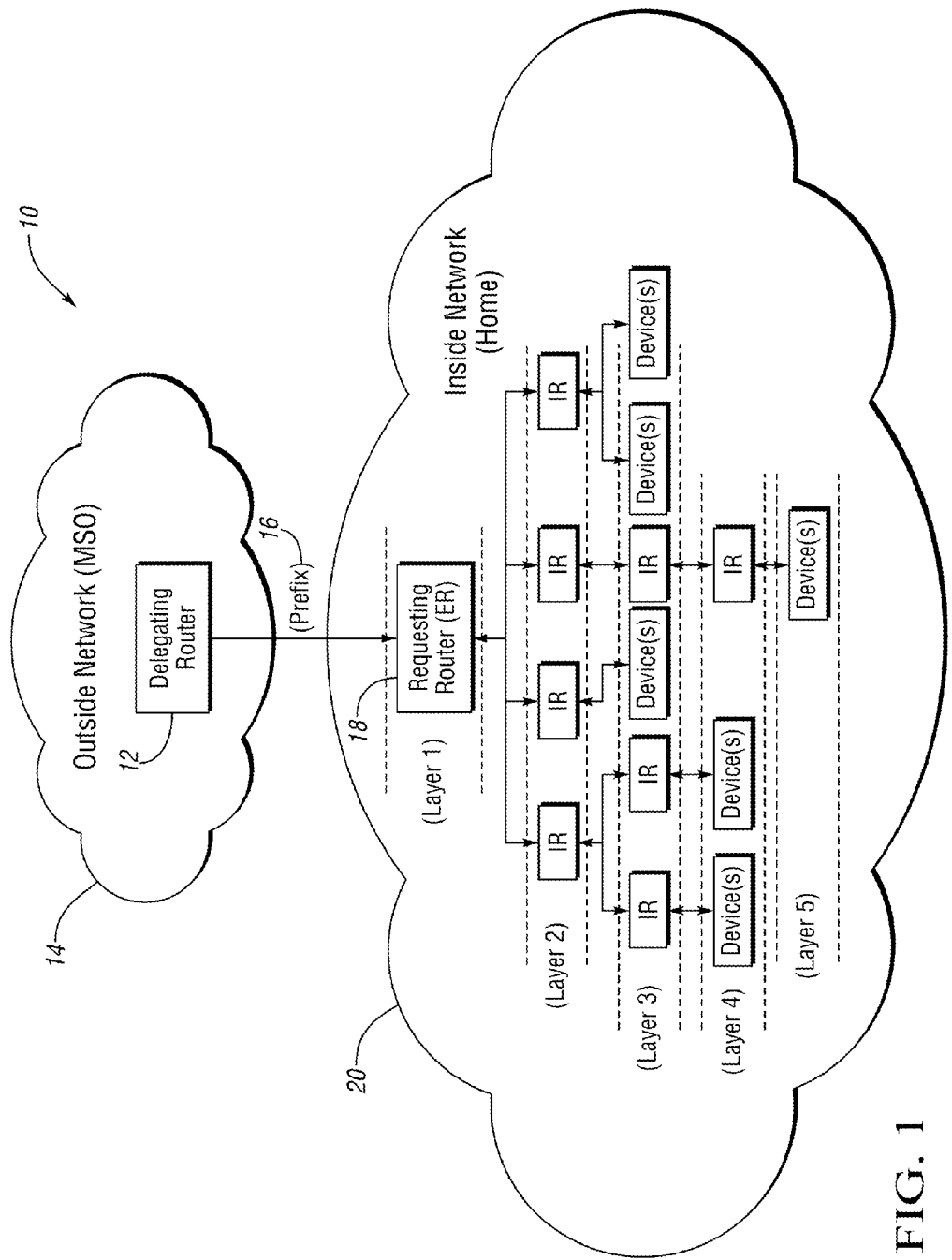
FIG. 1 illustrates a role based router system in accordance with one non-limiting aspect of the present invention.

FIG. 1 illustrates a role based router system 10 in accordance with one non-limiting aspect of the present invention. The system 10 illustrates one exemplary configuration where a delegating router 12 associated with an outside network 14 provides a prefix 16 (first prefix) to a requesting router 18 for delegation within an inside network 20. The prefix 16 may be any suitable addressing prefix, such as but not necessarily limited to an Internet Protocol version 6 (IPv6) prefix and an Internet Protocol version 4 (IPv4) prefix. The present invention is predominately described with respect to use of IPv6 without necessarily intending to limit the scope of the present invention. Dynamic Host Configuration Protocol (DHCP), such as that described in Internet Engineering Task Force (IETF) request for comment (RFC) 2131, 3315 and 3633, the disclosures of which are hereby incorporated by reference in their entireties, or other suitable delegation processes may be employed to facilitate delegating the first prefix to the requesting router 18. The requesting router 18 may be configured to facilitate adaptively delegating the first prefix 16 to additional routers associated with the inside network 20, such as in the manner described in U.S. patent application Ser. No. 13/783,242, the disclosure of which is hereby incorporated by reference in its entirety.

The outside network 14 and the inside network 20 demonstrate one exemplary, non-limiting use of the present invention where a multiple system operator (MSO), Internet service provider (ISP) or other type of service provider is allocated a prefix or addressing domain by a suitable addressing entity to facilitate Internet-based messaging or other network-based messaging. The inside network 20 is shown to be distinguished from the outside network 14 to demonstrated one use case where an MSO may be tasked with facilitating messaging for a plurality of inside networks, such as but not necessarily limited to home networks or other internal networks associated with its subscribers. While only one inside network 20 is illustrated, the MSO may be responsible for facilitating prefix delegation with any number of inside networks or other downstream connected networks. The requesting router 18, which may be periodically referred to herein as a customer edge router (CER) or edge router (ER) where routers connected downstream may be periodically referred to herein as internal routers (IRs). Optionally, the ER, IRs and/or devices may be configured to receive multiple prefixes, such as in the manner described in U.S. patent application Ser. No. 13/754, 954, the disclosure of which is hereby incorporated by reference in its entirety.

A five layer architecture is shown to correspond with a first layer having the ER, a second layer having one or more IRs connected directly to the ER, a third layer having one or more IRs and/or devices connected to one of the second layer IRs, a fourth layer having one or more IRs and/or devices connected to one of the third layer IRs, and a fourth layer having one or more devices connected to one of the fourth layer IRs. The IRs and/or devices are shown to be connected to a single upstream ER or IRs as such devices may be configured to listen to no more than one delegating router/device on a link (solid lines) in order to comply with DHCP requirements. The single-connection of each component is shown for exemplary non-limiting purposes as the present invention fully contemplates the inside network having any number of configurations and interconnections between the ER, IRs and/or devices. The interconnections between the ER, IRs and devices are shown to correspond with wireline connections but may be similarly interconnected using wireless, radio frequency (RF), Bluetooth or other wireless types of links. One non-limiting aspect of the present invention contemplates the ER and/or the IRs being HIPnet routers or other consumer-level routers having off-the-shelf, default, pre-configured and/or consumer-level configurations.

In the event HIPnet routers, or other similarly pre-configured routers, interconnect to form the inside network, the inside network may be considered as a multi-router network or a SoHo network. One non-limiting aspect of the present invention contemplates a need to facilitate configuring capabilities and/or functionality of such routers to support inter-router communications within the multi-router network, including when such routers are deployed by network novices or other individuals lacking ability or desire to program, adjust or otherwise manipulating router functionality to communicate with each other over network links and/or to establish messaging protocols, hierarchical relationships, address assignments, prefix delegations, security measures, backup capabilities and a potential number of additional functional capabilities desired to properly and securely govern network communications. One non-limiting aspect of the present invention contemplates a role based router feature, such as but not necessary limited to a computer program product, having capabilities to automatically, adaptively and/or dynamically facilitate selection of desirable router functionality. The computer program product may be embedded in a non-transitory computer readable medium storing instructions, which when operable with a processor or other logically executing device, are sufficient for configuring router functionality.

Figure 2:
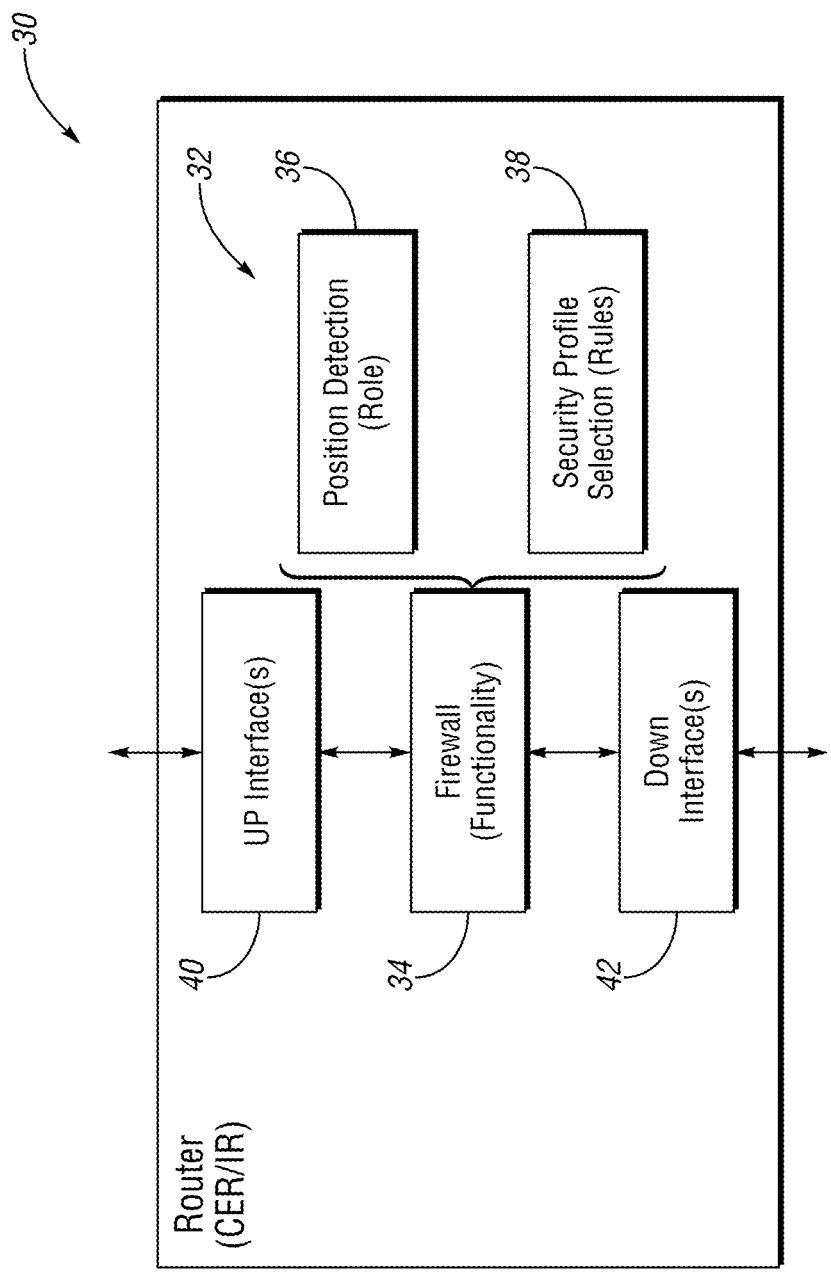
FIG. 2 illustrates a router having role based features in accordance with one non-limiting aspect of the present invention.

FIG. 2 illustrates an exemplary router 32 deployed within the system 10 having role based features 32 in accordance with one non-limiting aspect of the present invention. The role based features 32 are shown to correspond with a functionality module 34, a position detection module 36 and a security profile selection module 38, although other configurations and/or modules may be included without deviating from the scope and contemplation of the present invention. The modules 34, 36, 38 may be associated with a processor (not shown) to facilitate executing operations according to instructions stored in a computer-readable medium (not shown) or the modules 34, 36, 38 may be otherwise associated with the router 30 to facilitate the contemplated operations. Optionally, the modules 34, 36, 38 may be part of or embodied in a computer program product installable on the router 30 prior to deployment, downloaded thereto as part of the DHCP provisioning or other provisioning associated within initially providing internet access or access to other provider services, and/or included within a controller operable within the multi-router network 20 to facilitate router provisioning and functionality limitation. The modules 34, 36, 38 and/or other logically executing features contemplated by the present invention may be used facilitate automatically configuring functionality of the routers 30 deployed in the multi-router network 20 to automatically, adaptively and/or dynamically facilitate selection of desirable router functionality.

The router 30 shown to include one or more of up interfaces 40 and one or more down interfaces 42. The router 30 may be a directionless router having a plurality of receptacles configured to facilitate connection to cables or other wired communication mediums used to communicate signals between other routers 30 within the multi-router network and/or wireless interfaces to perform some operations. The interfaces 34, 36, 38 may be adaptively assigned to an up direction and a down direction depending on positioning of the corresponding router within the multi-router network 20. The router 30 may include a directional processing feature (not shown), such as but not necessary limited to that described in U.S. patent application Ser. No. 13/792,023, entitled Interface Directionality Assignment, filed Mar. 9, 2013, the disclosure of which is hereby incorporated by reference in its entirety, to facilitate assigning up/down directionality to each of the interfaces 34, 36, 38. While not intending to limit the scope and contemplation of the present invention and/or the positioning or hierarchical relevance of the corresponding router, the up interface(s) 40 may be associated with or characterize as a wide area network (WAN) interface and the down interface(s) 42 may be associated with or characterize as a local area network (LAN) interface. The router 30 may be configured to route messages, signaling and other information between the up interface(s) 40 and the down interface(s) 42, with signaling traveling in a downstream direction from the up interface(s) 40 to the down interface(s) 42 and upstream direction from the down interface(s) 42 to the up interface(s) 40.

The signaling traveling between the up interface(s) 40 and the down interface(s) 42 may be processed according to functionality associated with the router 30. For exemplary non-limiting purposes, the functionality is illustrated with respect to a firewall. The firewall may be part of a functionality controller 34 configured to process, control and otherwise manipulate data packets (messages, signaling, etc.) passed between the interfaces. The firewall may be configured to block, transmit, process or otherwise manipulate signaling between the up interface(s) 40 in the down interface(s) 42 according to various settings and configurations. The firewall demonstrates one use of the present invention to facilitate automatically configuring firewall functionality according to various parameters associated with the multi-router network 20. Optionally, the firewall functionality may be selected according to a logical positioning of the corresponding router 30 within the multi-router network 20 in order to ensure desired inter-router communications and network security. While the firewall is illustrated, the present invention is not necessary limited to configuring firewall functionality and fully contemplates configuring other router functionality, including that described below in more detail. Configuring firewall functionality is believed to be particularly beneficial at least in that HIPnet routers or other pre-configured routers may include default or pre-set firewall functionality that can prevent desirable inter-router communications if not properly adjusted upon router deployment within the multi-router network.

The firewall may be considered as a stateful firewall, such as that described in RFC 6092, the disclosure of which is hereby incorporated by reference in its entirety. The stateful firewall may facilitate stateful packet inspection (SPI) to selectively inspect and permit or deny transmission therethrough of packets or other information data types depending on state of network connections, content, addresses and/or other information illustrative of the corresponding source/destination or otherwise reflective of the data transmission. The inspected information may be compared against a permitted set of information, database, signatures or other filtering related parameters to assess whether passage should be granted. The firewall may be deployed in a "default" state where packets other than those associated with an outgoing communication, i.e., a communication initiated from the router to an upstream device and/or router are blocked. The blocking of non-outgoing or upstream originating signaling may effectively prevent communications between routers (ER, IRs) and/or devices connected within the SoHo network (multi-router network) 20, including those connected to different subnets or links. This inability to support inter-router communications "out of the box" can be particularly problematic to consumers attempting to use routers, devices having routers and/or devices within a multi-router network.

The firewall may be operable between an enabled state where stateful protection blocks all but upstream originating signaling and a disabled state where all signaling, including upstream originating signaling, is permitted, such as by turning "off" the firewall protection. One non-limiting aspect of the present invention contemplates the position detection module 36 determining a positioning of the router 30 within the multi-router network 20 and selectively enabling and disabling the stateful firewall depending on the determined position. This may include the security profiles selection module 38 having a set of rules for specifying enablement/disablement of the firewall and/or other functionality of the router 30 according to its determined position. The security profile selection module 38 may include an edge security profile, an internal security profile or other position based profiles. The profiles may define a corresponding set of instructions, commands or other controls sufficient to achieve the desired functionality settings. Optionally, the instructions, etc., associated with the security profiles may be stored on the router 30 as a part of the computer program product, application, software or other control mechanism of the router 30. The present invention is predominately described with respect to the security profiles defining edge instructions and internal instructions for dictating functionality depending on whether the router 30 is characterized as an ER or an IR without intending to limit the scope and contemplation of the present invention as other positional characterizations are contemplated.

The positioning detection module 36 may be configured to determine positioning of the router or its role within the multi-router network, i.e., whether the router is an ER or an IR, as a function of messaging and/or addressing associated with assigning the router an address and/or a prefix. The role may be determined by performing a "48 check", a DHCPv6 CER-ID option and/or another type of positional determination, such as but not limited to a physical determination. The "48 check" may correspond with the position detection module 36 comparing the first 48 bits of the assigned IA_NA (address) to the first 48 bits of the assigned IA_PD (prefix) such that the router is determined to be an IR if the first 48 bits of each match and an ER if the first 48 bits fail to match. For example, if IA_NA/SLAAC is in a different/48 from the IA_PD, the router may be determined to be an ER, and if IA_NA/SLAAC is in the same/48 as its IA_PD, the router may be determined to be an IR. If the router does not obtain an IA_NA (e.g., because of being provisioned in an unnumbered fashion), then the router may determined to be an ER. Certain devices, such as but not necessary limited to cellular devices, may obtain an IA_PD but not an IA_NA. These types of devices may be unnumbered due to the mobile operators attempting to save addresses by not sending IA_NA. In such circumstances, the unnumbered devices may obtain a WAN address from the IA_PD as opposed the IA_NA. In this manner, when a router performs its edge detection test, it may recognize the combination of the absence of an assigned IPv6 address and the receipt of an assigned IPv6 prefix as indicative that the device is at the edge of the network. If the device is on the edge of the network, it may enable its firewall and IPv4 NAT; if it is interior to the network, it may disable the firewall and NAT and/or perform other operations as described it.

The DHCPv6 CER-ID option may correspond with the position detection module 36 utilizing a DHCPv6 option to identify whether the router is an ER, and if not then determining the router to be an IR. The DHCPv6 option may operate on the assumption that an ER sets a CER_ID (DHCPv6 option) to the IPv6 address of its LAN interface. If it has more than one LAN IPv6 address, it selects one of its LAN or loopback IPv6 addresses to be used in the CER_ID. An ISP server does not respond with the CER_ID or sets the CER_ID to ::, whereby receipt of such a response indicates the router is an ER and the failure to receive such a response indicates the router is an IR. In more detail, a DHCPv6 client may be configured to include the CER Identification option code in an Option Request option in its DHCP Solicit messages. The DHCPv6 server (delegating router) may include the CER Identification option in any response it sends to a client (requesting router) that has included the CER Identification option code in an Option Request option. The CER Identification option may be sent in the main body of the message to client, not as a sub-option, e.g., an IA_NA, IA_TA option. When sending the CER Identification option, the DHCPv6 server (delegating router) may set the CER_ID value to either one of its IPv6 addresses or ::. If a device (router) does not receive the CER Identification Option or receives a CER ID of :: from the DHCPv6 server, it may include one of its Globally Unique IPv6 address(es) in the CER_ID value in response to DHCPv6 messages received by its DHCPv6 server that contains the CER Identification option code in an Option Request option. If the device has only one LAN interface, it may use its LAN IPv6 address as the CER_ID value. If the device has more than one LAN interface, it may use the lowest Globally Unique address not assigned to its WAN interface.

The physical determination may be based on some routers 30 having a physical differentiator built into them by design that will indicate that they are an ER. Examples include mobile routers, DSL routers, and cable eRouters. In the case of a mobile router, the presence of an active cellular connection indicates that the router 30 is at the customer edge Likewise, for an eRouter, the presence of an active DOCSIS link tells the router that it is at the customer edge. HIPnet routers and others may use more than one of the above techniques in combination to determine the edge. For example, an internal router may check for the CER_ID option, but may also use the 48 check in case its upstream router does not support CER_ID.

In addition to the foregoing positional determination mechanisms, the present invention fully contemplates the use of other processes and/or features for routers 30 to determine the relative positioning within the logical hierarchy of a multi-router network 20. While contemplated, the positioning or hierarchical relevance of each router 30 may be determined without use of a routing protocol, such as Routing Information Protocol (RIP) and the Open-Shortest-Path-First protocol (OSPF), the disclosures of which are hereby incorporated by reference. The routing protocol may correspond with routing tables and other information provided to the router 30 to facilitate determining the relative position within the multi-router network. The routing tables may define routes between each one or more of the routers (ER, IRs) and/or known to the routers such that the receiving router 30 is then responsible for comparing the tables to determine its relative positioning. The capability of the present invention to facilitate positional determinations without use of such routing protocols may be advantageous with routers 30 that may not be configured with capabilities to process such routing tables, within environments where it may be difficult or impossible to provide desired routing tables to the routers 30 and/or to facilitate implementation of the contemplated role based router functionality selection without having to update or comply with routing protocol requirements.

While the foregoing utilizes positional determinations to facilitate selectively enabling and disabling firewall functionality, the present invention fully contemplates using positional determinations to facilitate implementing additional functionality in addition to or in place of the firewall functionality according to other rules or instructions set forth in a corresponding one of the security profiles. The router 30, for example, may be configured with a default or pre-set network address translator (NAT) parameter, particularly if the router is and IPv4 router or a dual stack router, i.e., a router having IPv4 and IPv6 capability, whereby the default setting of the NAT parameter may thwart desired inter-router communications. The NAT parameters, similarly to the firewall parameter, may be set according to security profile roles depending on whether the corresponding router is and ER or and IR, e.g., the NAT may be disabled when the router 30 is an IR and enable when the router is an ER. Additional role based policies may include:

An ER rule denying incoming traffic on its WAN interface 40 (except DHCP, Neighbor Discovery, ICMP, or pre-established TCP, UDP, or multicast streams, which may be subscriber selectable);

An ER rule blocking outgoing Port Control Protocol (PCP) and UPnP IGD messages on its WAN interface 40, except for a default list (e.g. peer-to-peer, SIP/VoIP, gaming, and http), which may be subscriber selectable;

An ER rule blocking site-scoped multicast messages from being sent to the WAN 40, while IRs forward site-scoped multicast messages out all interfaces 40, 42 (optionally, provided they pass a Reverse Path Forwarding check);

An IR rule enabling full support for PCP MAP messages. That is, the IR serves as a PCP server for all MAP messages, not just a limited subset;

An IR rule enabling operation as a UPnP/PCP gateway;

An IR rule enabling "Simple Security", such as that described in RFC 6092;

An IR rule enabling "Advanced Security", such as that described in I-D.vyncke-advanced-ipv6-security, the disclosure of which is hereby incorporated by reference in its entirety, which may optional provide Intrusion Detection/Intrusion Protection; and/or A special IR connecting rule enabling a "medium trust" network (e.g. SmartGrid) to filter PCP messages from the inside network to the special security zone network. The special security zone can be identified by ULA address space not used in the internal network.

Within the illustrated multi-router network 20, it may desirable for the routers 30 to be equipped with stateful firewall capabilities. Such routers may provide "on by default" security where incoming traffic is limited to return traffic resulting from outgoing packets. It may also be desirable to allow users to create inbound 'pinholes' for specific purposes, such as online gaming, manually similar to those described in Simple Security. "Advanced Security" features optionally may be used to support the concept of end-to-end IPv6 reachability and could be added to provide intrusion detection (IDS/IPS) support. Local Network Protection for IPv6 (RFC4864), the disclosure of which is hereby incorporated by reference in its entirety, may be used to facilitate firewall functions that replace NAT security and calls for simple security. The present invention recommends that the ER enable a firewall by default and that IRs have at least one of the three options described below:

IR Firewall Option 1—Filtering Disabled: Once a home router determines that it is not the CER, it disables its firewall and allows all traffic to pass. The advantages of this approach is simple and easy to troubleshoot and it facilitates whole-home service discovery and media sharing. The disadvantages are that it does not protect home devices from each other (e.g. infected machines could affect entire home network).

IR Firewall Option 2—Simple Security+PCP: Home routers may have a stateful firewall on by default, regardless of CER/IR status but IRs allow "pin-holing" using PCP I-D.ietf-pcp-base, the disclosure of which is hereby incorporated by reference in its entirety. CERs can restrict opening PCP pinholes on the up interface. The advantages of this approach may be that it protects the home network from internal threats in other LAN segments and it minors legacy IPv4 router behavior. The disadvantages to this approach may be that it is less predictable; it relies on application "pin-holing", a "default deny" rule that may interfere with service discovery and/or content sharing, and requires PCP clients (e.g. on PCs and CPE devices).

IR Firewall Option 3—Advanced Security: Once a home router determines that it is not the CER, it may disable its stateful firewall and activate a firewall (IPS). The advantages to this approach may be that it protects the home network from internal threats in other segments and is more predictable than Option 2, since internal traffic is allowed by default. The disadvantages may be that adaptive filtering is more complex than static filtering and may require a "fingerprint" subscription to work well.

Of course, while the foregoing describes recommended router behavior, device manufacturers and/or software providers may leverage the capabilities of the present invention to facilitate role based router functionality implementation, optionally according to positional determinations, to specify additional security profiles and to make router security options user configurable.

Figure 3:
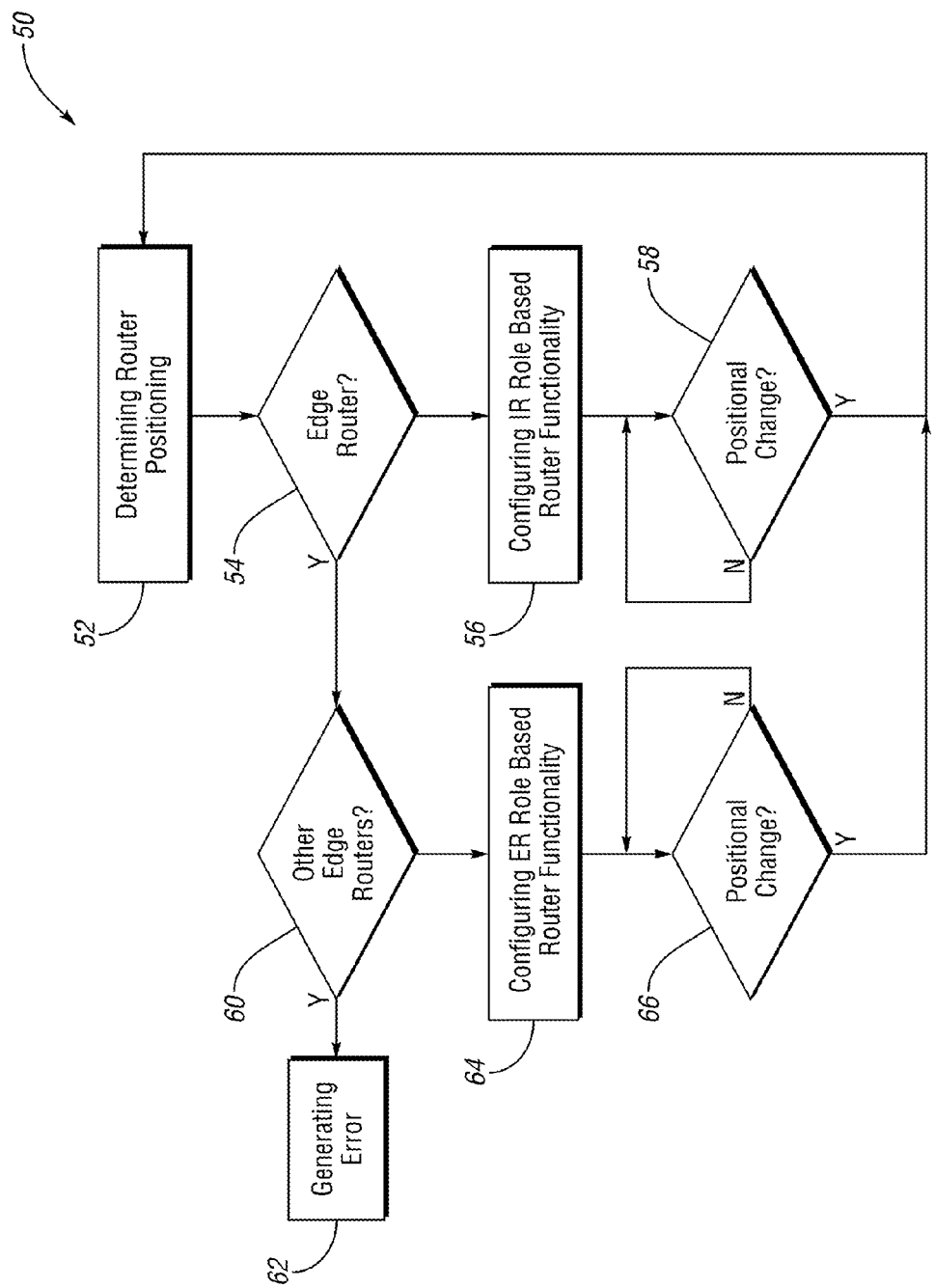
FIG. 3 illustrates a flowchart for a method of facilitating role based router functionality in accordance with one non-limiting aspect of the present invention.

FIG. 3 illustrates a flowchart 50 for a method of facilitating role based router functionality in accordance with one non-limiting aspect of the present invention. The method may be used to facilitate automatically configuring routers deployed within a multi-router network or other logical hierarchy defined by physical and/or wireless connectivity according to the roles played by each router. The method is predominately described with respect to the router roles being based on relative router positioning, which for exemplary non-limiting purposes is assumed to correspond with one of an internal position and an edge position. The internal position is characterized as the corresponding router being an IR having a wireline or wireless upstream connection either directly to an ER or another IR. The edge position is characterized as the corresponding router being an ER having a wireline or wireless upstream connection to a router outside of the multi-router network, such as that associated with an ISP, MSO or other service provider (e.g. a cable, satellite or broadcast television service provider; a cellular phone service provider, a voice over Internet protocol (VoIP) service provider; a content streaming/downloading source; etc.).

Blocks 52, 54 relates to determining router positioning. The routers may individually determine router positioning upon being connected within the multi-router network. The router positioning, for example, may be determined as a function of addressing or other messaging information provided to the connecting router upon establishing a connection within the multi-router network. Optionally, the routers may be instructed as to the relative positioning by a controller, network administrator or other features associated with the multi-router network. One non-limiting aspect the present invention contemplates the routers individually determining router positioning by comparing addressing bits, such as that associated with an IA_NA and/or IA_PD provided thereto and/or as a function of a CER_ID option. The router positioning determination may not necessarily be dispositive of the routers position relative to other similarly characterize routers, i.e., the router positioning inquiry may simply confirm whether the router is an ER or an IR. Once the router determines itself to be an IR, and while contemplated to do so, additional determinations regarding the router's positioning relative to other IRs need not be performed, which can be beneficial in ameliorating processing demands on the router.

Block 56 relates to configuring IR role based router functionality for the router after the router positioning determines the router to be an IR. The IR role based router functionality may be implemented according to an internal security profile stored on the router and/or provided thereto. The internal security profile may include roles, instructions, commands and/or other information associated with facilitating automatic configuration of the router according to desired role based functionality. The internal security profiles may specify a plurality of internal instructions sufficient for automatically controlling the router to implement the desired functionality, such as to facilitate setting firewall, NAT and/or other capabilities of the router without requiring corresponding user interaction or programming of the router. Optionally, the configuring the IR role based functionality may include directing implementation of multiple functional capabilities according to a plurality of internal rules and/or profiles associated with the IR positioning determinations, which be beneficial to facilitate implementing non-security and/or non-networking parameters for the router.

Block 58 relates to determining a positional change in the IR. The positional change may corresponding with a role of the router changing with the home network, such as in the event the router changes from an IR to an ER and/or if the router changes IR positions from one portion or subnet to another portion of subnet of the multi-router network. While the particular IR router positioning or subnet need not necessarily be determined, in the event certain internal router profiles are provided for certain portions or subnets (e.g. to set different security parameters for certain portions of the network), such a determination may be implemented in order to implement correspondingly specific role based functionality. The router may also change from an IR characterization to an ER characterization in the event multi-homing occurs, the previously determined ER fails or requires temporary use of one of the IRs for backup, a change in hierarchical relationship is implemented and/or a connection of the IR not available to a previously determined ER is required to facilitate communications. In the event these or other positional changes are determined, Block may be returned to facilitate implementation of corresponding role based functionality.

Block 60 relates to determining the router to be in the edge position and assessing whether additional edge positioned routers are active within the multi-router network. The assessment of Block 60 may be an optional step to check whether the prefix delegation processing and/or addressing assignment properly constructed the multi-router network to include a single ER or at least a single ER for the type of services, network, etc. being performed with the router attempting to implement role based functionality (e.g., the multi-router network may have virtual networks, tunnels, etc. that allow the use of multiple ERs for the corresponding services). Block 62 is reached in the event multiple edge positioned routers are determined to be in conflict to facilitate generating an error message or implementing other corrective action. In the event the multi-router network prevents multiple routers from being characterized as edge positioned and/or the router is unable to make such an assessment (e.g., the router may be unable to make such an assessment without utilizing router protocols), Block 60 may be bypassed in favor of directly proceeding to Block 64.

Block 64 relates to configuring IR role based router functionality for the router after the router positioning determines the router to be an ER. The ER role based router functionality may be implemented according to an edge security profile stored on the router and/or provided thereto. The edge security profile may include roles, instructions, commands and/or other information associated with facilitating automatic configuration of the router according to desired role based functionality. The edge security profiles may specify a plurality of edge instructions sufficient for automatically controlling the router to implement the desired functionality, such as to facilitate setting firewall, NAT and/or other capabilities of the router without requiring corresponding user interaction or programming of the router. Optionally, the configuring the IR role based functionality may include directing implementation of multiple functional capabilities according to a plurality of edge rules and/or profiles associated with the ER positioning determinations, which be beneficial to facilitate implementing non-security and/or non-networking parameters for the router. Block 66 relates to performing a positional change assessment for the ER similar to the manner described in Block 58.

As supported above, one non-limiting aspect of the present invention contemplates facilitating firewall functionality on a home router that changes based on the role played by the router (e.g. whether it is at the customer edge or internal to the network). The process is contemplated by the present invention may be beneficial in providing security throughout the home network, while providing extra protection at the edge. This may enable enhanced communication within the home, while also securing the home from unwanted attack.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having a plurality of instructions executable with a processor associated with a router to facilitate determining whether the router when within a multi-router network is at one of an edge position and an internal position, the multi-router network including the router as one of a plurality of routers arranged in a logical hierarchy requiring no more than one of the plurality of routers to be at the edge position and the remaining ones of the plurality of routers to be at the internal position, the plurality of instructions being sufficient for:
   determining an Internet Protocol (IP) address assigned to a wide area network (WAN) interface of the router;
   determining an IP prefix delegated to a local area network (LAN) interface of the router;
   determining the router to be at one of the edge position and the internal position as a function of the IP address and the IP prefix;
   facilitating operation of the router based at least in part on whether the router is determined to be at the edge position or the internal position;
   determining the IP address for the router from an IA_NA response transmitted thereto, the IA_NA response specifying the IP address;
   determining the IP prefix for the router from an IA_PD response transmitted thereto, the IA_PD response specifying the IP prefix; and
   comparing a first 48 bits of the IP address with a first 48 bits of the IP prefix to generate a result indicating one of a match and a non-match, the match occurring when the first 48 bits of the IP address match with the first 48 bits of the IP prefix and the non-match occurring when the first 48 bits of the IP address fail to match with the first 48 bits of the IP prefix;
   determining the router to be at the edge position when the non-match is determined; and
   determining the router to be at the internal position when the match is determined.

2. The non-transitory computer-readable medium of claim 1 further comprising the plurality of instructions being sufficient for:
   communicating a first result to a profile selection module of the router when the match is determined, the profile selection module thereafter implementing a first set of control instructions, commands or other controls sufficient to operate the router according to the internal position determination; and
   communicating a second result to the profile selection module of the router when the non-match is determined, the profile selection module thereafter implementing a second set of control instructions, commands or other controls sufficient to operate the router according to the edge position determination, the first set of control instructions, commands or other controls differing at least in part from the second set of control instructions, commands or other controls.

3. The non-transitory computer-readable medium of claim 1 further comprising the plurality of instructions being sufficient for:
   facilitating implementation of a first set of controls sufficient to operate the router according to the internal position determination when the match is determined.

4. The non-transitory computer-readable medium of claim 3 further comprising the plurality of instructions being sufficient for:
   facilitating implementation of a second set of controls sufficient to operate the router according to the edge position determination when the non-match is determined, the second set of controls differing at least in part from the first set of controls.

5. The non-transitory computer-readable medium of claim 1 further comprising the plurality of instructions being sufficient for:
   determining the IA_PD response from a Dynamic Host Configuration Protocol (DHCP) server.

6. The non-transitory computer-readable medium of claim 1 further comprising the plurality of instructions being sufficient for:
   issuing a Dynamic Host Configuration Protocol (DHCP) request from the router with an IA_NA option and an IA_PD option, the IA_NA and the IA_PD options requesting a DHCP server receiving the DHCP request to transmit the IA_NA response and the IA_PD response to the router.

7. The non-transitory computer-readable medium of claim 1 further comprising the plurality of instructions being sufficient for:
   issuing a Dynamic Host Configuration Protocol (DHCP) request from the router with an IA_NA option and an IA_PD option, the IA_NA and the IA_PD options requesting a DHCP server to transmit the IA_NA response and the IA_PD response;
   determining the first 48 bits of the IP address from the IA_NA response;
   determining the first 48 bits of the IP prefix from the IA_PD response;
   facilitating implementation of a first set of controls sufficient to operate the router when the internal position is determined; and
   facilitating implementation of a second set of controls sufficient to operate the router when the edge position is determined, the second set of controls differing at least in part from the first set of controls.

8. A method for determining whether a router within a multi-router network is at one of an edge position and an internal position, the multi-router network including the router as one of a plurality of routers arranged in a logical hierarchy requiring no more than one of the plurality of routers to be at the edge position and the remaining ones of the plurality of routers to be at the internal position, the method comprising:
   determining an Internet Protocol (IP) address assigned to a wide area network (WAN) interface of the router;
   determining an IP prefix delegated to a local area network (LAN) interface of the router;
   determining the router to be at one of the edge position and the internal position as a function of the IP address and the IP prefix;
   facilitating operation of the router based at least in part on whether the router is determined to be at the edge position or the internal position;

determining the IP address for the router from an IA_NA response transmitted thereto, the IA_NA response specifying the IP address;

determining the IP prefix for the router from an IA_PD response transmitted thereto, the IA_PD response specifying the IP prefix; and comparing a first 48 bits of the IP address with a first 48 bits of the IP prefix to generate a result indicating one of a match and a non-match, the match occurring when the first 48 bits of the IP address match with the first 48 bits of the IP prefix and the non-match occurring when the first 48 bits of the IP address fail to match with the first 48 bits of the IP prefix;

determining the router to be at the edge position when the non-match is determined; and determining the router to be at the internal position when the match is determined.

9. The method of claim 8 further comprising:

communicating a first result to a profile selection module of the router when the match is determined, the profile selection module thereafter implementing a first set of control instructions, commands or other controls sufficient to operate the router according to the internal position determination; and communicating a second result to the profile selection module of the router when the non-match is determined, the profile selection module thereafter implementing a second set of control instructions, commands or other controls sufficient to operate the router according to the edge position determination, the first set of control instructions, commands or other controls differing at least in part from the second set of control instructions, commands or other controls.

10. The method of claim 8 further comprising facilitating implementation of a first set of controls sufficient to operate the router according to the internal position determination when the match is determined.

11. The method of claim 10 further comprising facilitating implementation of a second set of controls sufficient to operate the router according to the edge position determination when the non-match is determined, the second set of controls differing at least in part from the first set of controls.

12. The method of claim 8 further comprising determining the IA_PD response from a Dynamic Host Configuration Protocol (DHCP) server.

13. The method of claim 8 further comprising issuing a Dynamic Host Configuration Protocol (DHCP) request from the router with an IA_NA option and an IA_PD option, the IA_NA and the IA_PD options requesting a DHCP server receiving the DHCP request to transmit the IA_NA response and the IA_PD response to the router.

14. The method of claim 8 further comprising:

issuing a Dynamic Host Configuration Protocol (DHCP) request from the router with an IA_NA option and an IA_PD option, the IA_NA and the IA_PD options requesting a DHCP server to transmit the IA_NA response and the IA_PD response;

determining the first 48 bits of the IP address from the IA_NA response;

determining the first 48 bits of the IP prefix from the IA_PD response;

facilitating implementation of a first set of controls sufficient to operate the router when the internal position is determined; and facilitating implementation of a second set of controls sufficient to operate the router when the edge position is determined, the second set of controls differing at least in part from the first set of controls.

15. A router comprising:

a plurality of interfaces configured for routing data packets, including at least one up interface and at least one down interface; and a position detection module having a plurality of instructions executable with a processor of the router to facilitate determining whether the router when within a multi-router network is at one of an edge position and an internal position, the multi-router network including the router as one of a plurality of routers arranged in a logical hierarchy requiring no more than one of the plurality of routers to be at the edge position and the remaining ones of the plurality of routers to be at the internal position, the plurality of instructions being sufficient for:

i) determining an Internet Protocol (IP) address assigned to a wide area network (WAN) interface of the plurality of interfaces;

ii) determining an IP prefix delegated to a local area network (LAN) interface of the plurality of interfaces;

iii) determining the router to be at one of the edge position and the internal position as a function of the IP address and the IP prefix;

iv) facilitating operation of the router based at least in part on whether the router is determined to be at the edge position or the internal position;

v) determining the IP address for the router from an IA_NA response transmitted thereto, the IA_NA response specifying the IP address;

vi) determining the IP prefix for the router from an IA_PD response transmitted thereto, the IA_PD response specifying the IP prefix; and vii) comparing a first 48 bits of the IP address with a first 48 bits of the IP prefix to generate a result indicating one of a match and a non-match, the match occurring when the first 48 bits of the IP address match with the first 48 bits of the IP prefix and the non-match occurring when the first 48 bits of the IP address fail to match with the first 48 bits of the IP prefix;

viii) determining the router to be at the edge position when the non-match is determined; and ix) determining the router to be at the internal position when the match is determined.

16. The router of claim 15 wherein the plurality of instructions are sufficient for:

communicating a first result to a profile selection module of the router when the match is determined, the profile selection module thereafter implementing a first set of control instructions, commands or other controls sufficient to operate the router according to the internal position determination; and communicating a second result to the profile selection module of the router when the non-match is determined, the profile selection module thereafter implementing a second set of control instructions, commands or other controls sufficient to operate the router according to the edge position determination, the first set of control instructions, commands or other controls differing at least in part from the second set of control instructions, commands or other controls.

17. The router of claim 15 wherein the plurality of instructions are sufficient for facilitating:

implementation of a first set of controls sufficient to operate the router according to the internal position determination when the match is determined; and implementation of a second set of controls sufficient to operate the router according to the edge position determination when the non-match is determined, the second set of controls differing at least in part from the first set of controls.

18. The router of claim 15 wherein the plurality of instructions are sufficient for issuing a Dynamic Host Configuration Protocol (DHCP) request from the router with an IA_NA option and an IA_PD option, the IA_NA and the IA_PD options requesting a DHCP server receiving the DHCP request to transmit the IA_NA response and the IA_PD response to the router.

19. The router of claim 15 wherein the plurality of instructions are sufficient for:
- issuing a Dynamic Host Configuration Protocol (DHCP) request from the router with an IA_NA option and an IA_PD option, the IA_NA and the IA_PD options requesting a DHCP server to transmit the IA_NA response and the IA_PD response;
- determining the first 48 bits of the IP address from the IA_NA response;
- determining the first 48 bits of the IP prefix from the IA_PD response;
- facilitating implementation of a first set of controls sufficient to operate the router when the internal position is determined; and
- facilitating implementation of a second set of controls sufficient to operate the router when the edge position is determined, the second set of controls differing at least in part from the first set of controls.

* * * * *